United States Patent Office 3,283,774
Patented Nov. 8, 1966

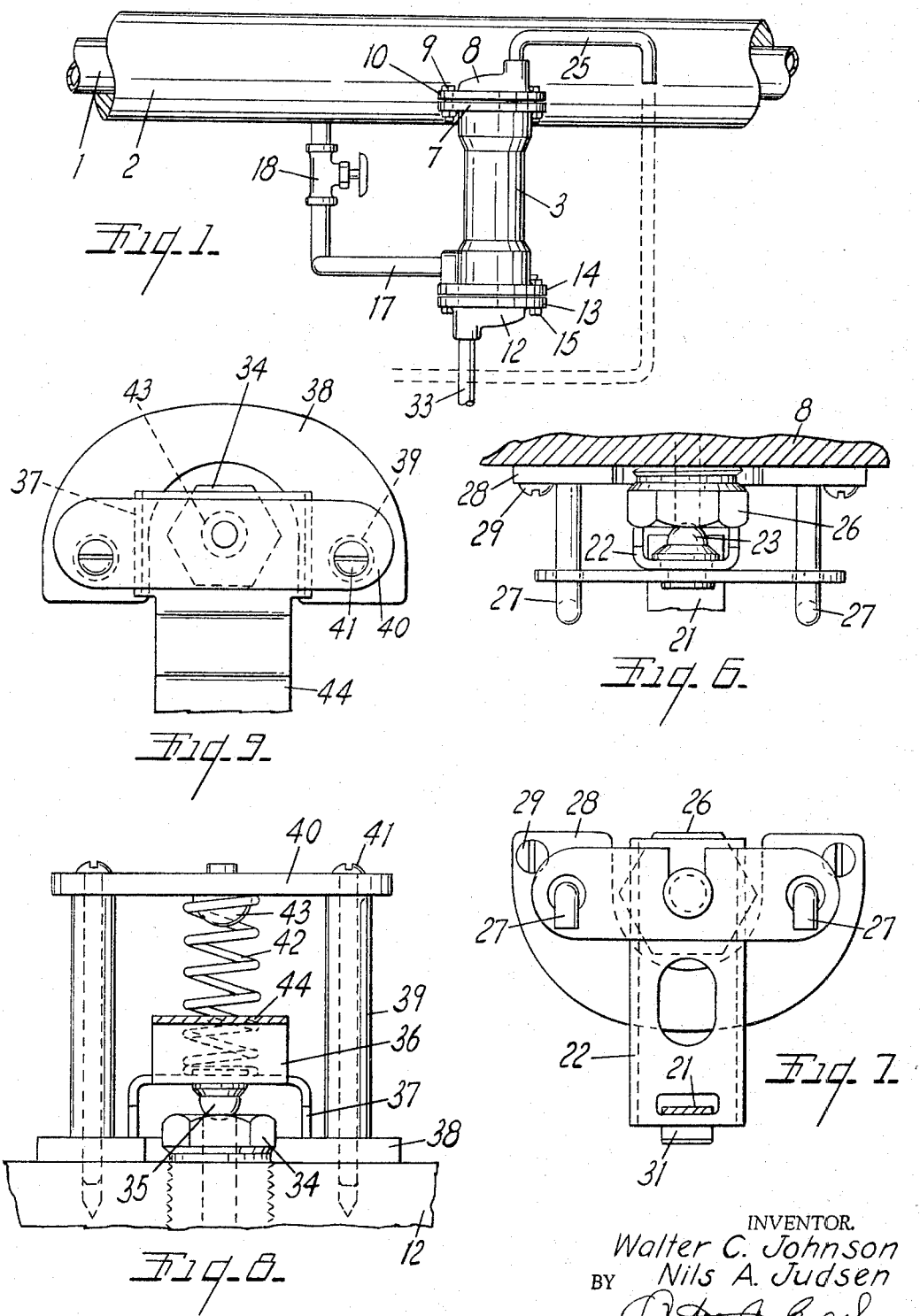

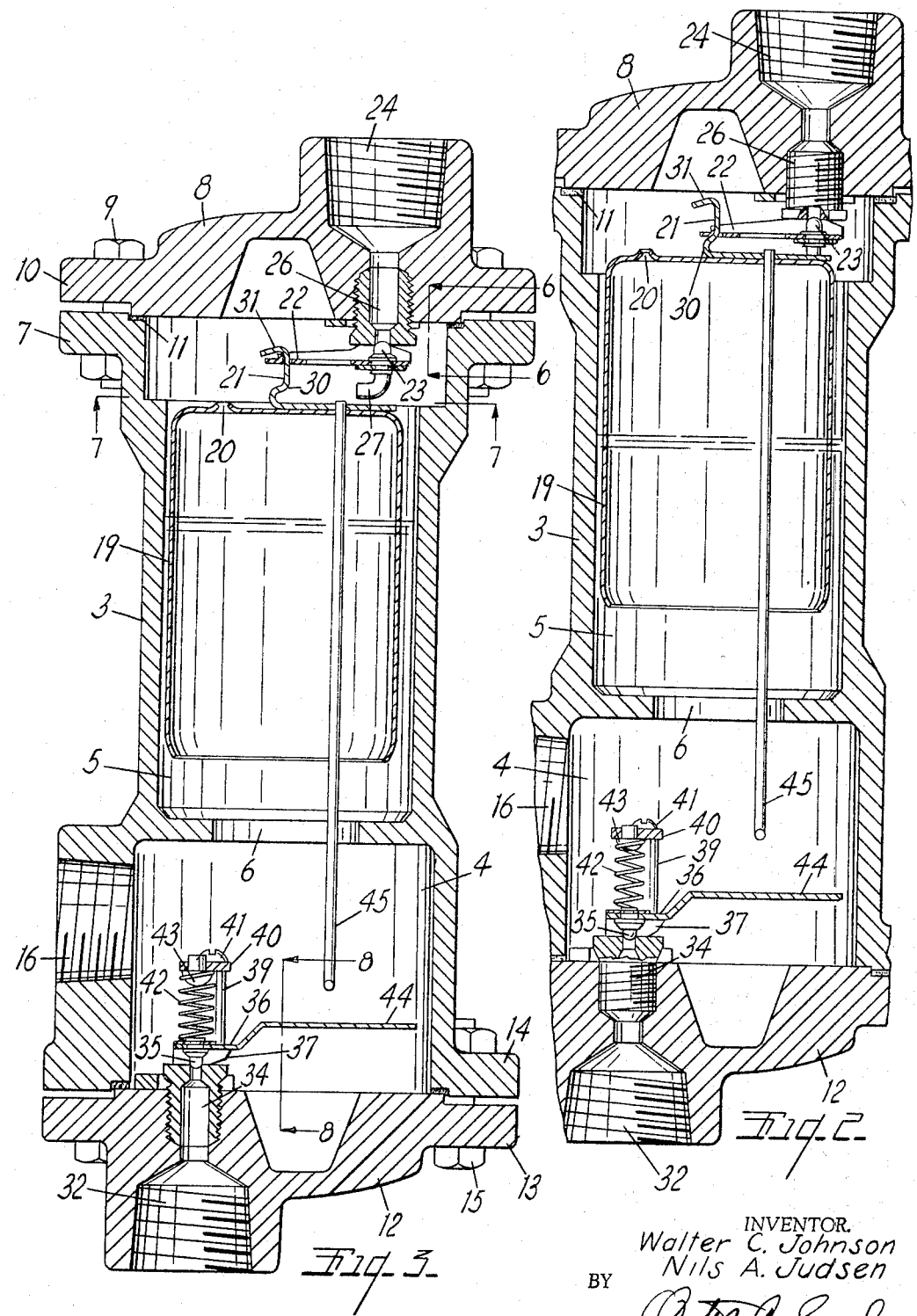

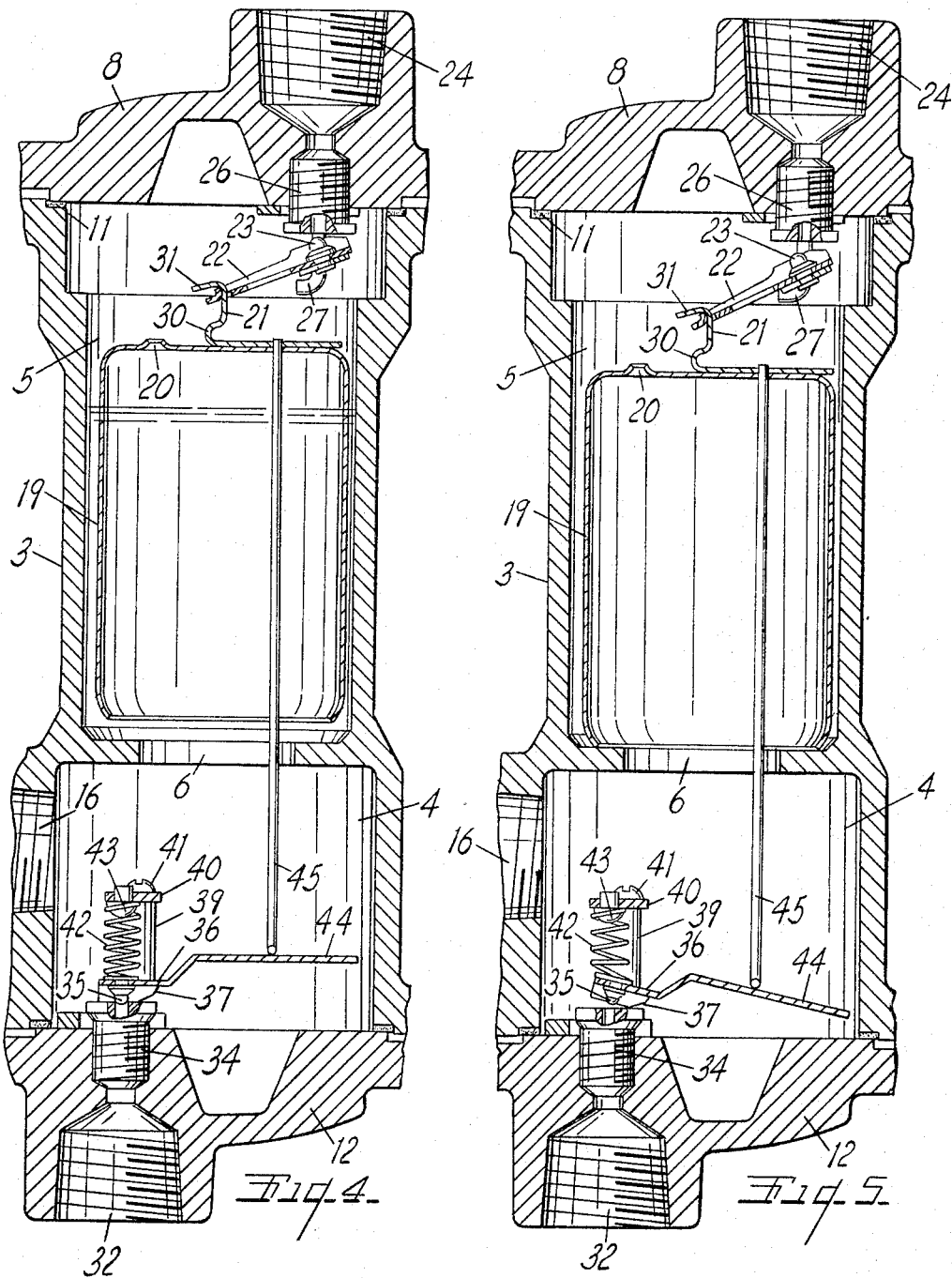

3,283,774
STEAM TRAP
Walter C. Johnson and Nils A. Judsen, Three Rivers, Mich., assignors to Armstrong Machine Works, Three Rivers, Mich.
Filed Feb. 10, 1964, Ser. No. 343,575
12 Claims. (Cl. 137—185)

This invention relates to Steam Traps. The main objects of this invention are:

First, to provide a steam trap with means for preventing freezing of condensate in the trap in the event that steam is cut off or the system is not in use or to discharge condensate in the event that there should be a substantial amount thereof in the circulating system.

Second, to provide a steam trap having these advantages or features which functions automatically.

Third, to provide a structure having these advantages which may be installed in various types of steam circulating systems.

Objects relating to details and economies of the invention will appear from the description to follow. The invention is defined and pointed out in the claims. A preferred embodiment of the invention is illustrated in the accompanying drawing, in which:

FIG. 1 is a side elevational view of the steam trap embodying our invention illustrated in operative relation or connections to a steam circulating system, a fragment of which is conventionally illustrated.

FIG. 2 is an enlarged fragmentary vertical section of a steam trap embodying our invention and with the valves in closed position and the float in what would normally be its initial use position.

FIG. 3 is a view corresponding to FIG. 2 except that the float has become lowered in one use position following that of the position shown in FIG. 2.

FIG. 4 is a fragmentary vertical section corresponding to that of FIG. 3 with the float in position to open the discharge valve at the upper end of the float chamber.

FIG. 5 is a vertical section corresponding to that of FIGS. 2, 3 and 4 with the float in its fully lowered position in which position its discharge valve at the bottom of the apparatus is opened.

FIG. 6 is an enlarged fragmentary view partially in section on a line corresponding to line 6—6 of FIG. 3 illustrating the discharge.

FIG. 7 is an enlarged fragmentary view on a line corresponding to line 7—7 of FIG. 3.

FIG. 8 is an enlarged fragmentary view on a line corresponding to line 8—8 of FIG. 3.

FIG. 9 is an enlarged top or plan view of the discharge valve mechanism of FIG. 8.

In the accompanying drawing 1 represents a steam circulating conduit and 2 insulation provided therefor. These parts are conventionally shown and it should be understood that no attempt is made to show other parts in commercial sizes corresponding to that of the steam conduit and its insulation and these circulating systems conventionally illustrated in FIGS. 1 and 2 form no port of our invention but they are illustrated to show the operative relation of our invention to a circulating system.

The body member 3 is desirably formed as a casting and includes an inlet chamber 4 and a float chamber 5 connected through the opening 6. The body member 3 has a flange-like portion 7 at its upper end to which the top member 8 is detachably connected by the bolts 9, the top member having a laterally projecting portion 10 through which the bolts are arranged.

A seal or gasket 11 is provided and the bottom member 12 is provided with a flange-like portion 13 secured to the flange-like portion 14 on the body member as by means of the bolts 15. The body member is provided with an inlet 16 opening to the inlet chamber 4 and connected to the conduit 1 by means of the connecting pipe 17 which is provided with a valve 18. This conduit and the valve are shown conventionally.

The float 19 is open at the bottom and has a restricted discharge 20 in its top and it is provided with an upwardly projecting arm 21 slidably engaging the arm 22 of the outlet valve 23. The top body member is provided with a discharge coupling means 24 to which the outlet or pipe or conduit 25 is connected. The disposal of this discharge conduit is not illustrated. The valve seat member 26 is threaded into the inner side of the top member 8. The valve 23 is tiltably mounted on the depending brackets 27 which depend from the supporting plate 28 connected to the top of the housing member by the screws 29 or the like. These valve supporting arms 27 have laterally turned lower ends and the valve support member is slidably mounted on these arms above the laterally turned ends so the valve has a substantially vertical movement. See its closed position in FIGS. 2 and 3 and its open position in FIGS. 4 and 5.

The coupling arm 21 mounted on the float to project upwardly therefrom has vertically spaced stop members 30 and 31 which coact with the arm 22 thus permitting a substantially vertical movement of the float, as is indicated in FIGS. 2 and 3, without opening the valve 23.

The inlet chamber 4 is provided with a discharge 32 to which the discharge conduit 33 is connected. This outlet 32 is provided with a valve member 34 with which the valve 35 coacts. See the enlarged views in FIGS. 8 and 9 of this valve apparatus.

The valve 35 is mounted on the valve support member 36 having portions 37 which are tiltably engaged with the coupling plate 38. The post-like portions 39 project upwardly from this plate or member 38 and the crosspiece 40 is secured thereto by the screws 41 which project through these post-like members 39.

The valve is yieldingly seated by the spring 42, the upper end of which is engaged with the stud 43 and the lower end of which is engaged with the valve support member 36, the spring 42 acting to releasably hold the valve in its seated position.

The valve support member has a laterally projecting arm 44 which is disposed in alignment with the valve actuating rod 45 which is mounted on the top of the float to project downwardly therefrom through the opening 6 to open the valve 36 when the float is in its fully lowered position, as illustrated in FIG. 5.

It will be understood that the trapped air and steam in the float varies under varying use conditions some of which variations are indicated in FIGS. 2, 3, 4 and 5.

The port 20 is a restricted port and allows steam and air to pass from the float into the float chamber above the float. FIGURES 2, 3, 4 and 5 illustrate varying use positions and when the float drops or lowers to the position shown in FIG. 5 the discharge valve in the bottom chamber is opened so that all water collected in the valve unit drains out. However, when steam is turned on or the water has drained out and steam enters, the float is again lifted to its initial position, as shown in FIG. 2.

We have illustrated and described our invention in a commercial embodiment thereof. We have not attempted to illustrate or describe various adaptations and uses as it is believed that this disclosure will enable those skilled in the art to embody or adapt our invention as may be desired.

Having thus described the invention, what is claimed as new and desired to secure by Letters Patent is:

1. An apparatus of the class described comprising a body member having an inlet chamber and a cylindrical float chamber disposed above said inlet chamber, said chambers being connected by an opening disposed centrally relative to the float chamber, said float chamber having a bottom portion surrounding said opening, a top member detachably mounted on said body member and provided with a float chamber discharge passage having an inwardly facing valve seat at its inner end, a bottom member detachably mounted on said body member and provided with a discharge passage for said inlet chamber having an inwardly facing valve seat at its inner end, a cylindrical float disposed in said float chamber and having an upwardly projecting centrally disposed arm on its upper end provided with spaced lugs, said float being open at its lower end and having a restricted air outlet in its top, a valve coacting with said valve seat of said float chamber discharge passage provided with an elongated tiltably mounted arm-like support having an opening therein through which said arm on said float is disposed and with which said lugs thereon coact, said lugs being spaced so that substantial movement of said float is permitted with said float chamber outlet valve in closed position but acting to open said valve when said float is in its retracted support engagement with said bottom portion of said float chamber, a spring seated discharge valve coacting with said valve seat of said discharge passage of said inlet chamber and having a laterally projecting arm, and an actuating rod for said inlet chamber discharge valve mounted on said float in alignment with but in nonactuating engageemnt with said inlet chamber discharge valve when said float is in actuated position but acting to open said inlet chamber discharge valve and hold it open when said float is in its retracted supportedly engaged position with said float chamber bottom portion.

2. An apparatus of the class described comprising a body member having an inlet chamber and a float chamber disposed above said inlet chamber, said chambers being connected by an opening, said float chamber having a bottom portion surrounding said opening, a top member detachably mounted on said body member and provided with a float chamber discharge passage having an inwardly facing valve seat at its inner end, a bottom member detachably mounted on said body member and provided with a discharge passage for said inlet chamber having an inwardly facing valve seat at its inner end, a float disposed in said float chamber and having an upwardly projecting arm on its upper end provided with spaced lugs, said float being open at its lower end and having a restricted air outlet in its top, a valve coacting with said valve seat of said float chamber discharge passage provided with an elongated tiltably mounted support with which said lugs coact, said lugs being spaced so that substantial movement of said float is permitted with said float chamber outlet valve in closed position but acting to open said valve when said float is in its retracted supported engagement with said bottom portion of said float chamber, a spring seated discharge valve coacting with said valve seat of said discharge passage of said inlet chamber and having a laterally projecting arm, and an actuating rod for said inlet chamber discharge valve mounted on said float in alignment with but in nonactuating engagement with said inlet chamber discharge valve when said float is in actuated position but acting to open said inlet chamber discharge valve and hold it open when said float is in its retracted supportedly engaged position with said float chamber bottom portion.

3. An apparatus of the class described comprising a body member having an inlet and a float chamber disposed above said inlet, said float chamber having an outlet at its upper end provided with an inwardly facing valve seat, said body member having an outlet disposed below its inlet (a float disposed in said float chamber and having an upwardly projecting arm on its upper end provided with spaced lugs, said float being open at its lower end and having a restricted air outlet at its upper end, a valve coacting with said valve seat outlet of said float chamber and having a pivotally mounted support having an opening therein through which said arm on said float is disposed and with which said lugs on said arm coact, said lugs being spaced to permit substantialy movement of said float without actuation of said float chamber discharge valve when it is in closed position but acting to open said valve when said float is in its fully retracted position, said body member being provided with stop means for supporting said float in its retracted position, a pivotally mounted spring seated discharge valve coacting with said outlet at the lower end of said body member, and an actuating means for said discharge valve disposed on said float in alignment with but in nonactuating engagement with said discharge valve when said float is in actuated position but acting to open said valve when said float is in its fully retracted position.

4. An apparatus of the class described comprising a body member having an inlet and a float chamber disposed above said inlet, said float chamber having an outlet at its upper end provided with an inwardly facing valve seat, said body member having an outlet disposed below said float chamber, a float disposed in said float chamber and having an upwardly projecting arm on its upper end provided with spaced lugs, said float being open at its lower end and having a restricted air outlet at its upper end, a valve coacting with said valve seat outlet of said float chamber and having a pivotally mounted support having an opening therein through which said arm on said float is disposed and with which said lugs on said arm coact, said lugs being spaced to permit substantial movement of said float without actuation of said float chamber discharge valve when it is in closed position but acting to open said valve when said float is in its fully retracted position, said body member being provided with stop means for supporting said float in its retracted position, a discharge valve coacting with said outlet at the lower end of said body member, and an actuating means for said discharge valve disposed on said float in alignment with but in nonactuating engagement with said discharge valve when said float is in actuated position but acting to open said valve when said float is in its fully retracted position.

5. An apparatus of the class described comprising a body chambered member having an inlet and afloat chamber disposed above the inlet, said float chamber having an outlet, a float disposed in sail float chamber, said float being open at its lower end and having a restricted air outlet at its upper end, a valve coacting with said float chamber outlet, operating connections for said float to said valve permitting substantial movement of said float without opening said valve, said valve being closed by the upward movement of said float, said body member being provided with stop means limiting the retracted movement of said float and supporting it in its retracted position, a spring seated discharge valve disposed at the lower end of said body member and provided with a laterally projecting arm, and a valve actuating rod mounted on said float to depend therefrom and disposed in alignment with but in nonactuating engagement with said discharge valve when said float is in an actuated position but acting to open said valve when said float is in retracted supporting engagement with said stop means.

6. An apparatus of the class described comprising a body chambered member having an inlet and a float chamber disposed above the inlet, said float chamber having an outlet, a float disposed in said float chamber, said float being open at its lower end and having a restricted air outlet at its upper end, a valve coacting with said float chamber outlet, operating connections for said float to said valve permitting substantial movement of said float without opening said valve, said valve being closed by upward movement of said float, said body member being provided with stop means limiting the retracted movement of said float and supporting it in its retracted position, a spring seated discharge valve disposed at the lower end of said body member and provided with a laterally projecting arm, and a valve actuating rod mounted on said float to depend therefrom and disposed in alignment with but in nonactuating engagement with said discharge valve when said float is in an actuated position but acting to open said valve when said float is in retracted supporting engagement with said stop means.

7. An apparatus of the class described comprising a body chambered member having an inlet and a float chamber disposed above the inlet, said float chamber having an outlet, a float disposed in said float chamber, said float being open at its lower end and having a restricted air outlet at its upper end, a valve coacting with said float chamber outlet, operating connections for said float to said valve permitting substantial movement of said float without opening said valve, said valve being closed by the upward movement of said float, said body member being provided with stop means limiting the retracted movement of said float and supporting it in its retracted position, a spring seated discharge valve disposed at the lower end of said body member and means coacted by said float when it is in its retracted position for opening and holding said discharge valve in open position.

8. An apparatus of the class described comprising a body chambered member having an inlet and a float chamber disposed above the inlet, said float chamber having an outlet, a float disposed in said float chamber, said float being open at its lower end and having a restricted air outlet at its upper end, a valve coacting with said float chamber outlet, operating connections for said float to said valve permitting substantial movement of said float without opening said valve, said valve being closed by the upward movement of said float, said body member being provided with stop means limiting the retracted movement of said float and supporting it in its retracted position, a spring seated discharge valve disposed at the lower end of said body member and provided with a laterally projecting arm, and means actuated by said float for opening said discharge valve and holding it in open position when said float is in its retracted position and while it remains in that position.

9. An apparatus of the class described comprising a chambered body member having an inlet and a float chamber disposed above the inlet, said float chamber having an outlet, said body member having a drain outlet disposed below said float chamber, a float disposed in said float chamber, said float being open at its lower end and having a restricted air outlet at its upper end, a valve coacting with said float chamber outlet, operating connections for said float to said valve permitting substantial movement of said float without opening said valve, said valve being closed by the upward movement of said float, said body member being provided with stop means limiting the retracted movement of said float and supporting it in its retracted position, an automatically closing drain valve for the chamber of said body member, and a valve actuating rod mounted on said float to depend therefrom and disposed in alignment with but in nonactuating engagement with said discharge valve when said float is in actuated position but acting to open said valve when said float is in retracted supporting engagement with said stops.

10. An apparatus of the class described comprising a chambered body member having an inlet and a float chamber disposed above the inlet, said float chamber having an outlet, said body member having a drain outlet disposed below said float chamber, a float disposed in said float chamber, said float being open at its lower end and having a restricted air outlet at its upper end, a valve coacting with said float chamber outlet, operating connections for said float to said valve permitting substantial movement of said float without opening said valve, said valve being closed by upward movement of said float said body member being provided with stop means limiting the retracted movement of said float and supporting it in its retracted position, an automatically closing drain valve for the chamber of said body member, and a valve actuating rod mounted on said float to depend therefrom and disposed in alignment with but in nonactuating engagement with said drain valve when said float is in actuated position but acting to open said valve when said float is in retracted supporting engagement with said stops.

11. An apparatus of the class described comprising a chambered body member having an inlet and a float chamber disposed above the inlet, said float chamber having an outlet, said body member having a drain outlet disposed below said float chamber, a float disposed in said float chamber, said float being open at its lower end and having a restricted air outlet at its upper end, a valve coacting with said float chamber outlet, operating connections for said float to said valve permiting substantial movement of said float without opening said valve, said valve being closed by the upward movement of said float, said body member being provided with stop means limiting the retracted movement of said float and supporting it in its retracted position, and an automatically closing drain valve for the chamber of said body member and means for opening said drain valve coacted by said float when it is in its engagement by said stop means.

12. An apparatus of the class described comprising a chambered body member having an inlet and a float chamber disposed above the inlet, said float chamber having an outlet, said body member having a drain outlet disposed below said float chamber, a float disposed in said float chamber, said float being open at its lower end and having a restricted air outlet at its upper end, a valve coacting with said float chamber outlet, operating connections for said float to said valve permitting substantial movement of said float without opening said valve, said valve being closed by upward movement of said float said body member being provided with stop means limiting the retracted movement of said float and supporting it in its retracted position, an automatically closing drain valve for the chamber of said body member, and means actuated by said float for opening said drain valve and holding it in its open position when said float is in its fully retracted position and while it remains in that position.

References Cited by the Examiner
UNITED STATES PATENTS

| | | | |
|---|---|---|---|
| 1,885,894 | 11/1932 | Campbell | 137—203 |
| 2,004,953 | 6/1935 | Kaye | 137—185 |
| 2,790,456 | 4/1957 | Shaw | 137—185 X |

WILLIAM F. O'DEA, *Primary Examiner.*

ALAN COHAN, *Examiner.*